(12) United States Patent
Kaimer et al.

(10) Patent No.: US 7,475,918 B2
(45) Date of Patent: Jan. 13, 2009

(54) PRESS FITTING SYSTEM

(75) Inventors: Bernd Kaimer, Dusseldorf (DE); Tom Herberg, Guttau (DE)

(73) Assignee: Kaimer GmbH & Co. Holding KG, Essen (DE)

( * ) Notice: Subject to any disclaimer, the term of this patent is extended or adjusted under 35 U.S.C. 154(b) by 244 days.

(21) Appl. No.: 10/543,784

(22) PCT Filed: Dec. 3, 2003

(86) PCT No.: PCT/DE03/03971

§ 371 (c)(1),
(2), (4) Date: Feb. 23, 2006

(87) PCT Pub. No.: WO2004/068018

PCT Pub. Date: Aug. 12, 2004

(65) Prior Publication Data

US 2006/0175829 A1 Aug. 10, 2006

(30) Foreign Application Priority Data

Jan. 28, 2003 (DE) ................................ 103 03 296

(51) Int. Cl.
*F16L 13/14* (2006.01)
(52) U.S. Cl. ...................... 285/382.2; 285/374; 277/626
(58) Field of Classification Search .................. 285/245, 285/374, 382, 382.2; 277/314, 605, 616, 277/626
See application file for complete search history.

(56) References Cited

U.S. PATENT DOCUMENTS

| | | | | |
|---|---|---|---|---|
| D32,698 S | * | 5/1900 | Merwarth | D23/269 |
| 856,106 A | * | 6/1907 | Snow | 277/626 |
| 2,410,786 A | * | 11/1946 | Mallory | 285/260 |
| 2,615,740 A | * | 10/1952 | Nathan | 277/605 |
| 2,647,770 A | * | 8/1953 | Tollefsbol | 277/605 |
| 3,315,970 A | * | 4/1967 | Holoway | 277/615 |
| 4,299,399 A | * | 11/1981 | Haaland | 277/604 |
| 4,368,894 A | * | 1/1983 | Parmann | 277/615 |
| 4,371,180 A | * | 2/1983 | Case et al. | 277/652 |
| 4,948,153 A | * | 8/1990 | Takahashi et al. | 277/605 |
| 5,161,806 A | * | 11/1992 | Balsells | 277/383 |
| 5,362,115 A | * | 11/1994 | Carr | 285/363 |
| 5,551,706 A | * | 9/1996 | Barna et al. | 277/312 |

(Continued)

FOREIGN PATENT DOCUMENTS

DE 197 22 935 7/1998

(Continued)

*Primary Examiner*—David E Bochna
(74) *Attorney, Agent, or Firm*—Grossman Tucker Perreault & Pfleger, PLLC

(57) ABSTRACT

A press fitting system for creating an unremovably sealed connection between smooth-ended pipes comprises at least one section that is embodied in a collar-type manner and at least one bead which is located on the terminal side of the collar-type section and accommodates at least one annular, rubber-elastic sealing element. The press fiting system is characterized by the fact that groove-shaped channels which communicate with each other like a maze in the unpressed state of the sealing element run through at least some areas of the surface of the sealing element, the channels being pressed against each other in an occluding manner when the sealing areas interrupted by the channels are in the pressed state.

6 Claims, 6 Drawing Sheets

U.S. PATENT DOCUMENTS

| | | | |
|---|---|---|---|
| 6,056,291 A * | 5/2000 | Inagaki et al. | 277/314 |
| 6,260,891 B1 * | 7/2001 | Foering et al. | 285/382.2 |
| 6,511,076 B1 * | 1/2003 | Bruck et al. | 277/610 |
| 6,581,983 B1 * | 6/2003 | Viegener | 285/382 |
| 6,726,256 B2 * | 4/2004 | Viegener | 285/382 |

FOREIGN PATENT DOCUMENTS

| | | |
|---|---|---|
| DE | 298 13 935 | 10/1998 |
| DE | 101 18 956 | 6/2002 |

* cited by examiner

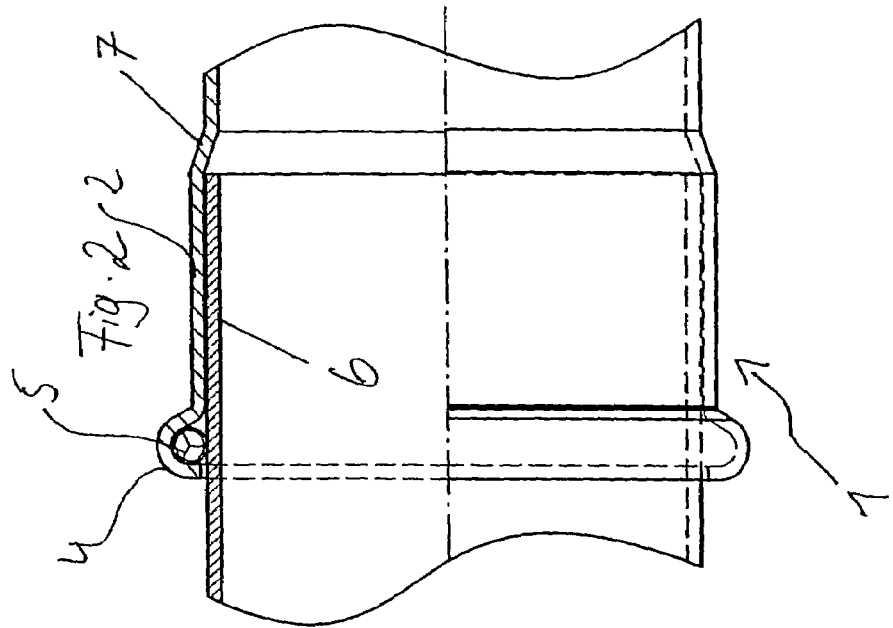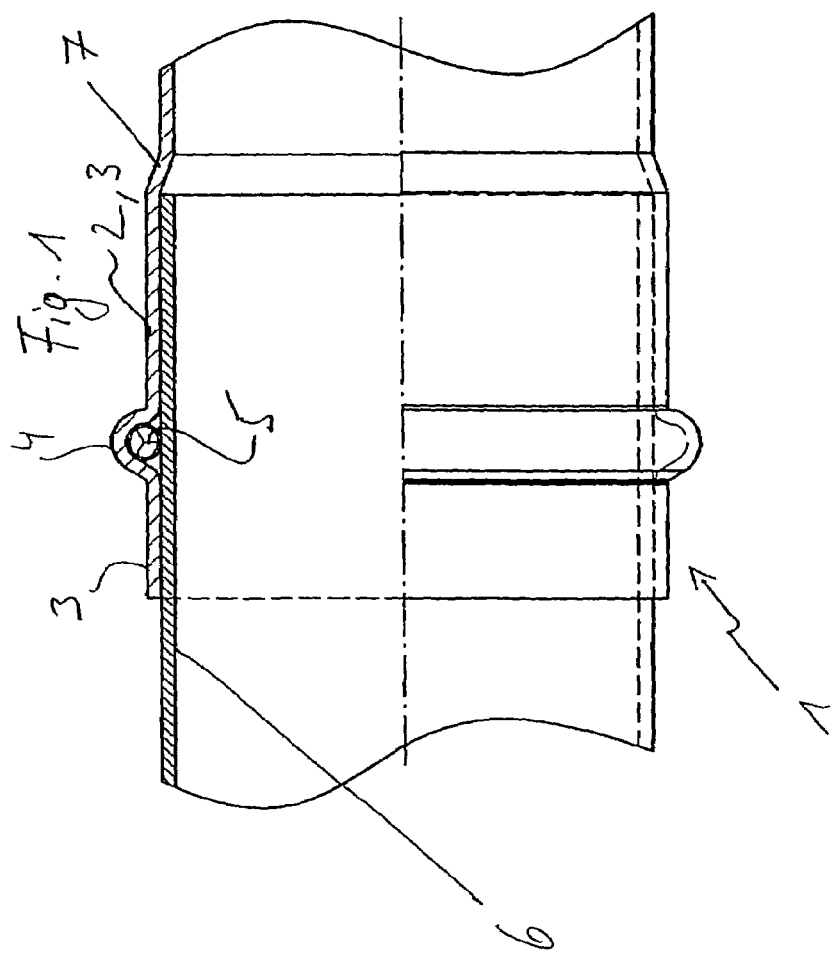

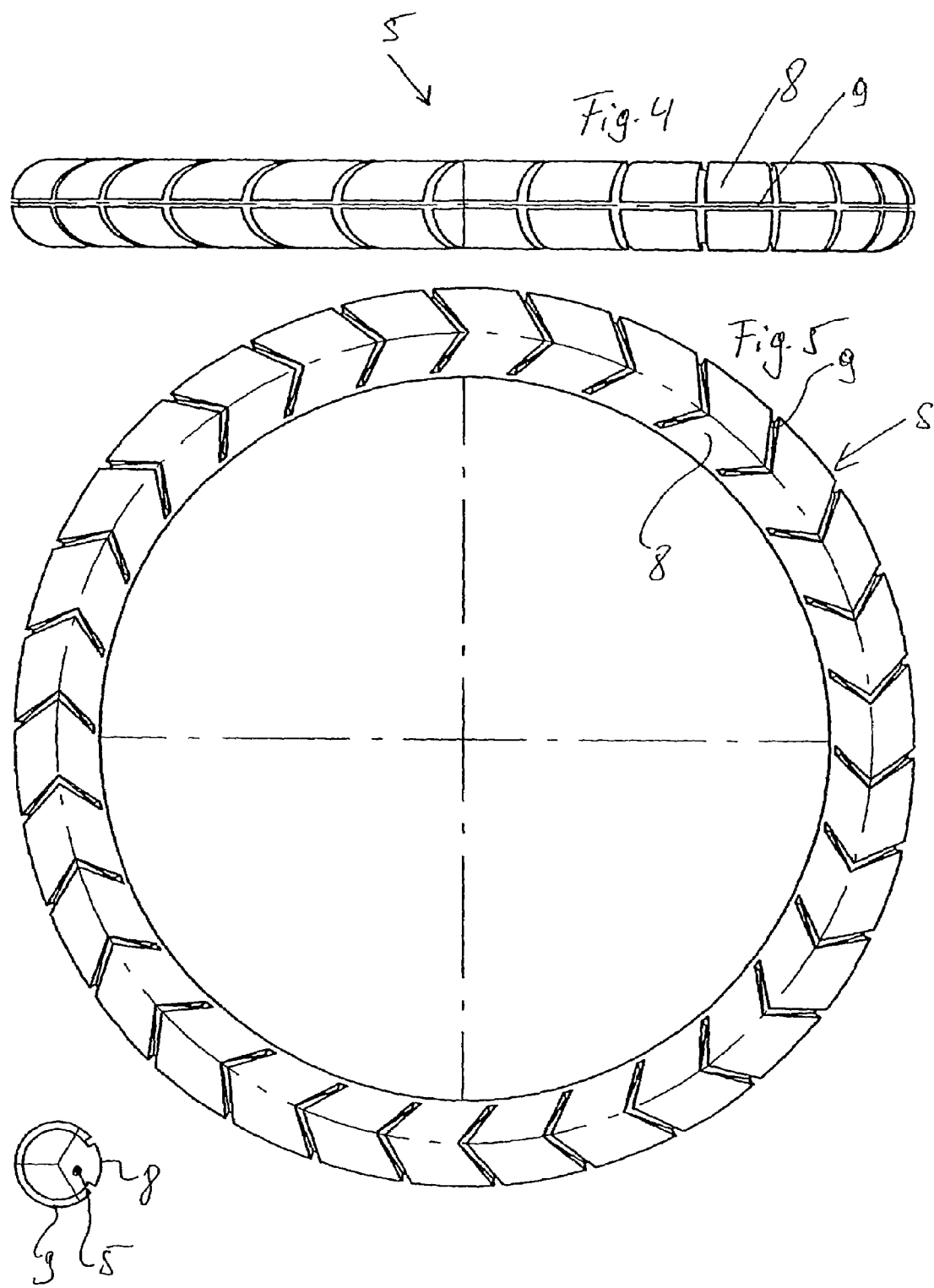

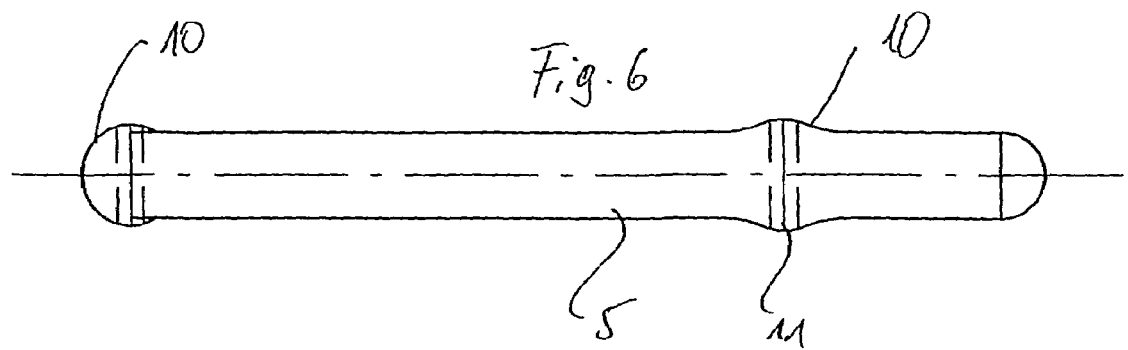
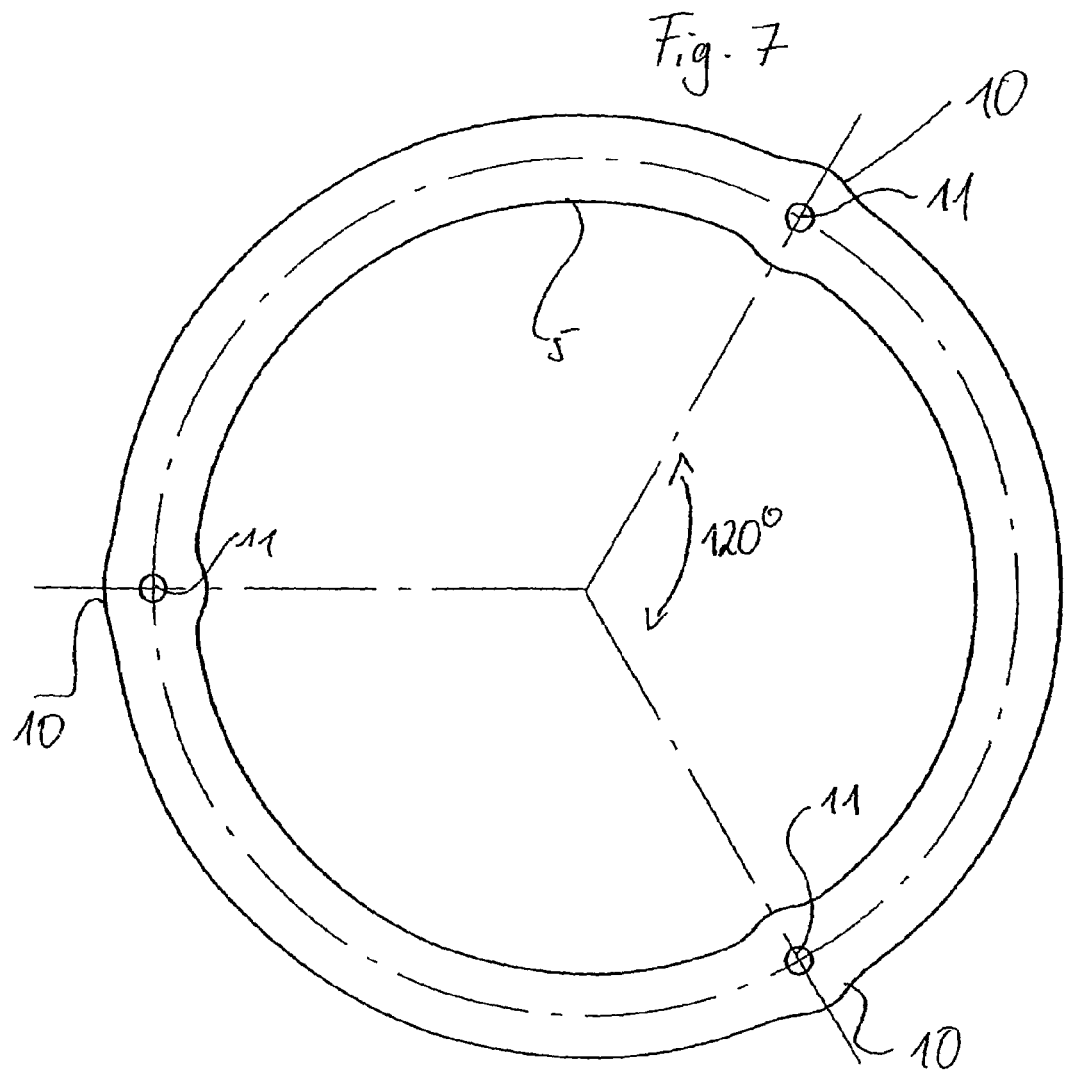

PRESS FITTING SYSTEM

FIELD

The invention relates to a press fitting for producing a non-releasably sealed connection between smooth-ended pipes with at least one cross-section of a socket-like configuration and at least one bead which is provided approximately at the end of the socket portion and which accommodates at least one annular, rubber-elastic sealing element.

BACKGROUND

Such a press fitting is known for example from DE 101 18 956 C1. Such a press fitting is also known from DE 197 22 935 C1. Sealing integrity in respect of the smooth-ended pipes which are respectively inserted at the end into the fitting is achieved by the sealing ring being elastically deformed by plastic deformation of the end of the press fitting, which is of a bead-like configuration, in order to come to bear over a given part of the periphery of the cross-section, in line form and/or surface form, against the surface regions, surrounding same, of the bead-like end of the fitting and the pipe. To carry the longitudinal forces which occur at a corresponding internal pressure, the portion of the fitting which adjoins the bead and which is either of a cylindrical or a toroidal configuration is plastically deformed together with the pipe.

After the production of a pipe connection by means of fittings and pipes, they are usually subjected to a pressure test. Any leakage in the region of the connection must be detectable when such a pressure test is carried out. In order to ensure that in any case, it is known for either the fitting, that is to say the bead of the fitting or the sealing ring, to be designed in such a way that they are not sealed in the unpressed condition. That can be implemented either by the dimensioning of the sealing ring and/or the bead or by virtue of a suitable surface configuration of the sealing ring.

DE 101 18 956 C1 for example proposes providing the sealing ring or the sealing element with a large number of small projecting knobs so that the surface of the sealing element, in the unpressed condition, bears only partially against the pipe wall inserted into the press fitting. Thus, in the unpressed condition, that arrangement involves permeability of the sealing ring in the axial direction.

A comparable solution has already been previously proposed in DE 197 22 935 C1. There, the sealing element is provided with a plurality of portions which are disposed in the peripheral direction and which are of a cross-section differing from the initial cross-section, in the form of a bulge which extends over the periphery and into the cross-sectional plane and a recess which is towards the inserted pipe and which extends radially into the cross-section of the sealing element, wherein the volume of the bulge, in comparison with the initial cross-section, is at least as great as the volume of the recess, which is missing in relation to the initial cross-section, and, considered in cross-section, prior to pressing, the recess of the sealing element forms a passage opening in the axial direction.

The sealing element in accordance with that solution is comparatively expensive to produce and requires production tolerances to be observed with the highest level of precision.

The solution in accordance with DE 101 18 956 involves the danger that the fine knobs on the outside surface of the sealing element tear away or are damaged when the pipe ends are pushed in.

Therefore the object of the invention is to improve a press fitting or a sealing element of the kind set forth in the opening part of this specification, such that the above-described disadvantages are avoided.

A plurality of solutions are proposed in accordance with the invention for that purpose.

SUMMARY

The object of the invention is firstly attained in that channels of a groove-shaped configuration extend at least in region-wise manner through the surface of the sealing element, which channels communicate with each other labyrinth-like in the unpressed condition of the sealing element, wherein the sealing surfaces which are interrupted by the channels are pressed against each other in the pressed condition to close the channels.

That solution has proven to be particularly advantageous if the sealing surfaces of the sealing element form the largest part of the surface of the sealing element.

As an alternative thereto, in accordance with the invention, there is proposed a press fitting as set forth in the classifying portion of claim 1, which is distinguished in that the sealing element has at least one thickening through which passes at least one bore.

The sealing element can have, in the direction in which it extends, a plurality of thickenings which are preferably arranged at equal spacings relative to each other.

Preferably the bores extend axially.

The thickenings can be in the form of toroidal beads.

In this variant of the press fitting according to the invention the bores which extend axially, that is to say in the longitudinal direction of the fitting, form axial passages or leakage points, in the unpressed condition. As soon as the component is pressed, the bores are closed, more specifically because the sealing ring is of a more voluminous nature around the bores than in the other regions.

In accordance with a further way of attaining the above-specified object, there is provided a press fitting as set forth in the classifying portion of claim 1, which is distinguished in that the sealing element, over its entire periphery, is of an identical cross-section which is not rotationally symmetrical and which over the periphery of the sealing element respectively assumes a different angular position in relation to an axis of symmetry through the geometrical center of gravity. The cross-section of the sealing element is therefore turned in itself over the entire periphery thereof, so that in the unpressed condition there are gaps between the fitting bead and the sealing element as well as between the inserted pipe and the sealing element. When the fitting is pressed, volume equalisation takes place. In that case the sealing ring seals both in relation to the fitting ridge portion or in relation to the bead and also in relation to the inserted pipe. That structure is particularly elegant both in terms of production procedure and also in regard to the manner of operation of the sealing element.

There is a comparatively great amount of freedom in terms of the choice of the cross-section of the sealing element, and that is also advantageous from the point of view of production procedure.

The sealing element can be for example of a polygonal cross-section which is turned in itself over the periphery of the sealing element. As an alternative thereto the sealing element can be of an elliptical cross-section which obviously is also turned in itself in the peripheral direction.

The term 'turned' in accordance with the invention is not to be interpreted as meaning that the sealing cord is twisted in itself, but rather as meaning that the sealing element is of the above-described geometry in the stress-free and unpressed condition.

BRIEF DESCRIPTION OF THE DRAWINGS

The invention is described in greater detail hereinafter by means of a number of embodiments by way of example illustrated in the drawing in which:

FIG. 1 shows a diagrammatic cross-section through a pipe connection according to the invention, FIG. 2 shows a diagrammatic view through a pipe connection according to the invention with an alternative configuration of the press fitting, FIG. 4 is a perspective plan view of a sealing element in accordance with a second embodiment of the invention, FIG. 5 is a perspective side view of the sealing element shown in FIG. 4, FIG. 6 is a perspective plan view of a sealing element in accordance with a third embodiment of the invention, FIG. 7 is a side view of the sealing element shown in FIG. 6.

DETAILED DESCRIPTION

Figure 3:
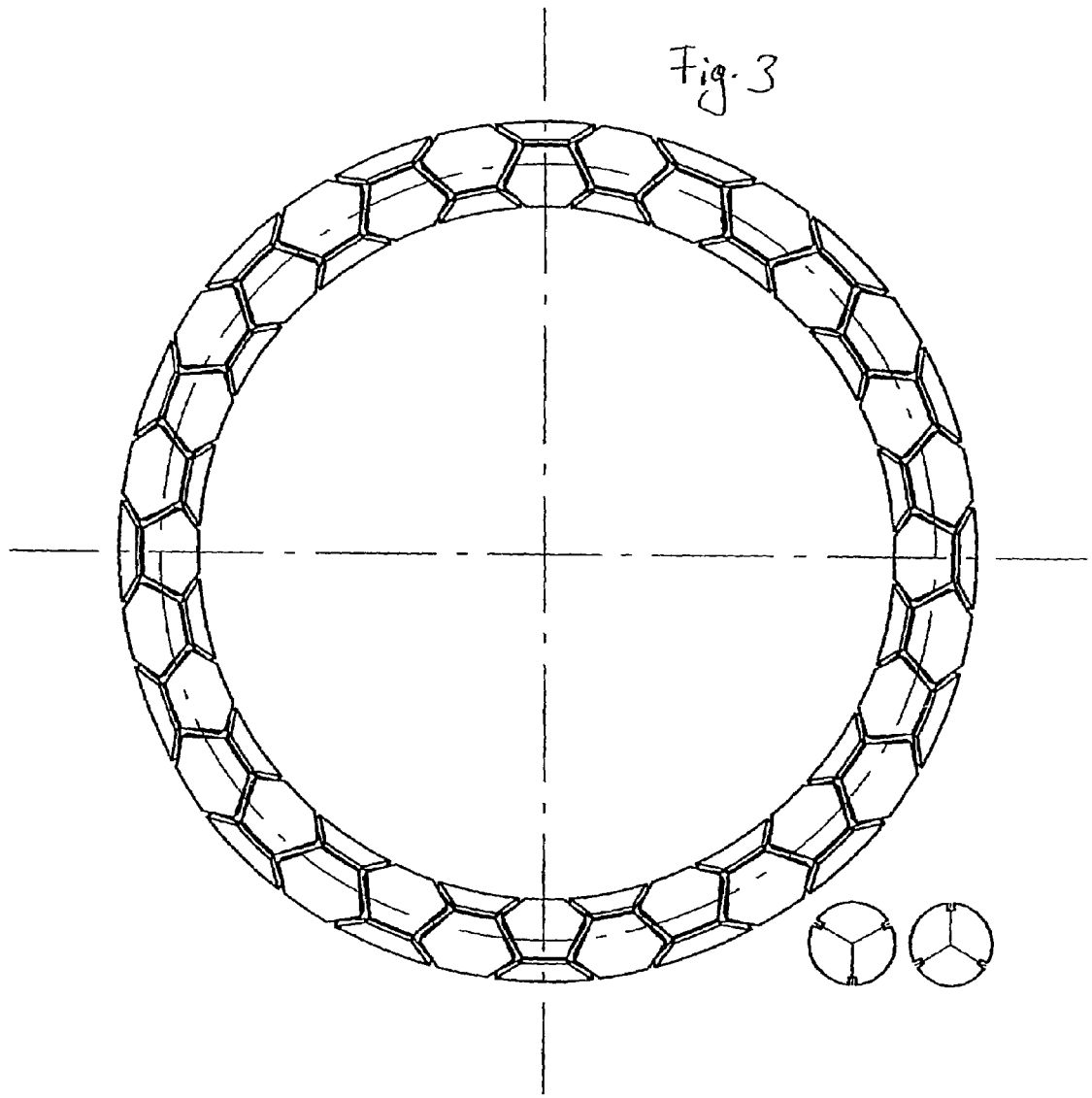
FIG. 3 is a perspective view of a first embodiment of the sealing element according to the invention.

FIGS. 1 and 2 each show a view in longitudinal section through a pipe connection 1 with a press fitting 2 according to the invention. The press fitting 2 comprises a region 3 which is of a socket-like configuration and which is either cylindrical or toroidal, depending on whether this involves a bend portion or a fitting which in itself extends in a straight line. At the respective end of the socket-like region, the press fitting 2 has a peripherally extending bead 4 which in turn accommodates an annular sealing element 5 of rubber-elastic material. The press fitting 2 accommodates a smooth-walled pipe end 6 which is pushed into same as far as an abutment 7. The abutment 7 can be formed either by a reduction in cross-section of the socket-like region 3 or by individual inwardly disposed portions which protrude into the internal cross-section thereof. In the case of the pipe connections 1 shown in FIGS. 1 and 2, the abutment 7 is respectively formed by a reduction in cross-section of the socket-like region 3. The press fittings 2 shown in FIG. 1 and FIG. 2 differ in that, in the case of the embodiment illustrated in FIG. 1, the bead 4 does not form the terminal end portion of the press fitting 2, but a portion of the socket-like region 3 extends on each of the two sides of the bead 4. In the embodiment illustrated in FIG. 2 in contrast the bead 4 forms the terminal end portion of the press fitting 2.

FIGS. 1 and 2 show the pipe connection 2 in the unpressed condition. Usually, the region of the press fitting 2, which is of a ridge or bead-like configuration, that is to say the bead 4 and the immediately adjoining region of the body of the fitting, are pressed by means of a pressing tool having pressing jaws, in the range of plastic deformation. In that situation the sealing element 5 is radially compressed so that it bears in linear contact against the outside wall of the pipe 6. The sealing element 5 can also already bear against the outside wall of the pipe 6, in the unpressed condition of the press fitting 2.

As already described in the opening part of this specification, upon pressure testing of the pipe connection it can happen that no leakage occurs even when the pipe connection is in the unpressed condition, and that is not desirable. Leakage is used to detect possibly unpressed pipe connections. More specifically, it can happen that leakage occurs only upon a pressure surge loading on the line. That pressure surge loading is comparatively high for example when using one-hand mixing lever fitments.

For that purpose in accordance with the invention the sealing element 5 is such that, in the unpressed condition of the pipe connection 1, an axial passage is provided between the sealing element 5 and the outside wall of the pipe 6. The configuration of the sealing element 5 is shown in FIGS. 3 through 10. FIG. 3 shows a first variant of the sealing element in which channels 9 of a labyrinth-like configuration and communicating with each other pass through the sealing surface 8 of the sealing element 5, similarly to a tire profile. The channels 9 form axial passages between the outside wall of the inserted pipe 6 and the sealing element 5 in the unpressed condition of the pipe connection 1.

As soon as the pipe connection 1 is pressed the sealing element 5 is radially compressed so that the channels 9 are pressed together and the result afforded is a continuous sealing surface 8.

FIGS. 4 and 5 show a second variant of the sealing element 5, in which the channels 9 extend through the sealing surface 8 only over a part of the periphery of the sealing element 5. Here, the channels 9 are omitted or interrupted for example at the side of the sealing element which in the installation position bears against the outside wall of the pipe 6, that is to say radially inwardly.

As an alternative thereto, the sealing element 5 can be of the configuration as illustrated in FIGS. 6 and 7. The sealing element 5 is in the form of a sealing cord of round cross-section, wherein provided at angular spacings of 120° over the periphery of the sealing element 5 are toroidal thickenings 10 which each have a respective bore 11 passing axially therethrough. Axially in this context means in the direction in which the press fitting 2 extends longitudinally. In other words, provided in that direction are axial passages which, by virtue of an accumulation of volume in the region of the thickenings 10, are closed in the pressed condition.

It will be self-evident to the man skilled in the art that the number of thickenings provided and the number of bores provided therein play a secondary part in regard to the invention.

Figure 8:
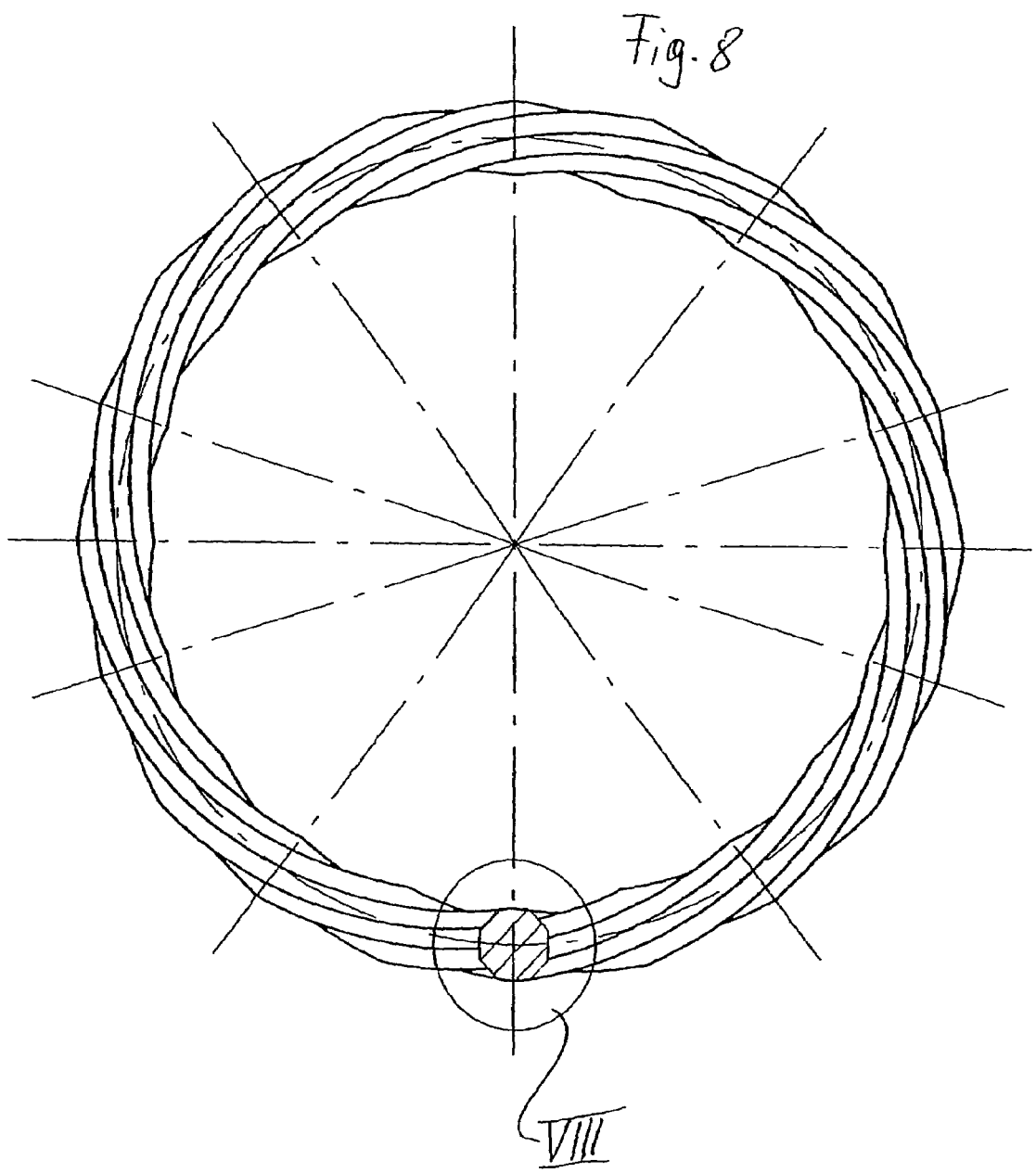
FIG. 8 is a diagrammatic view, partly in section, of the sealing element according to the invention in accordance with a fourth embodiment.
Figure 9:
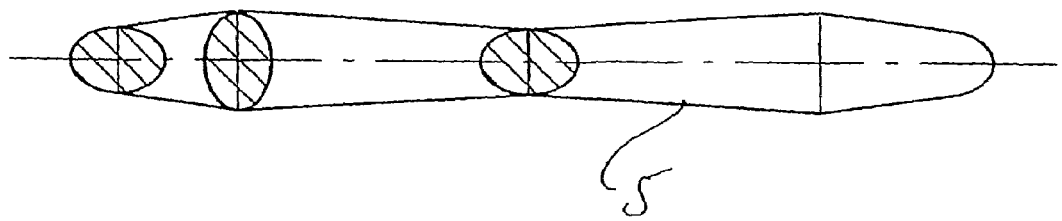
FIG. 9 shows a diagrammatic plan view, partly in section, of the sealing element in accordance with a fifth embodiment of the invention.
Figure 10:
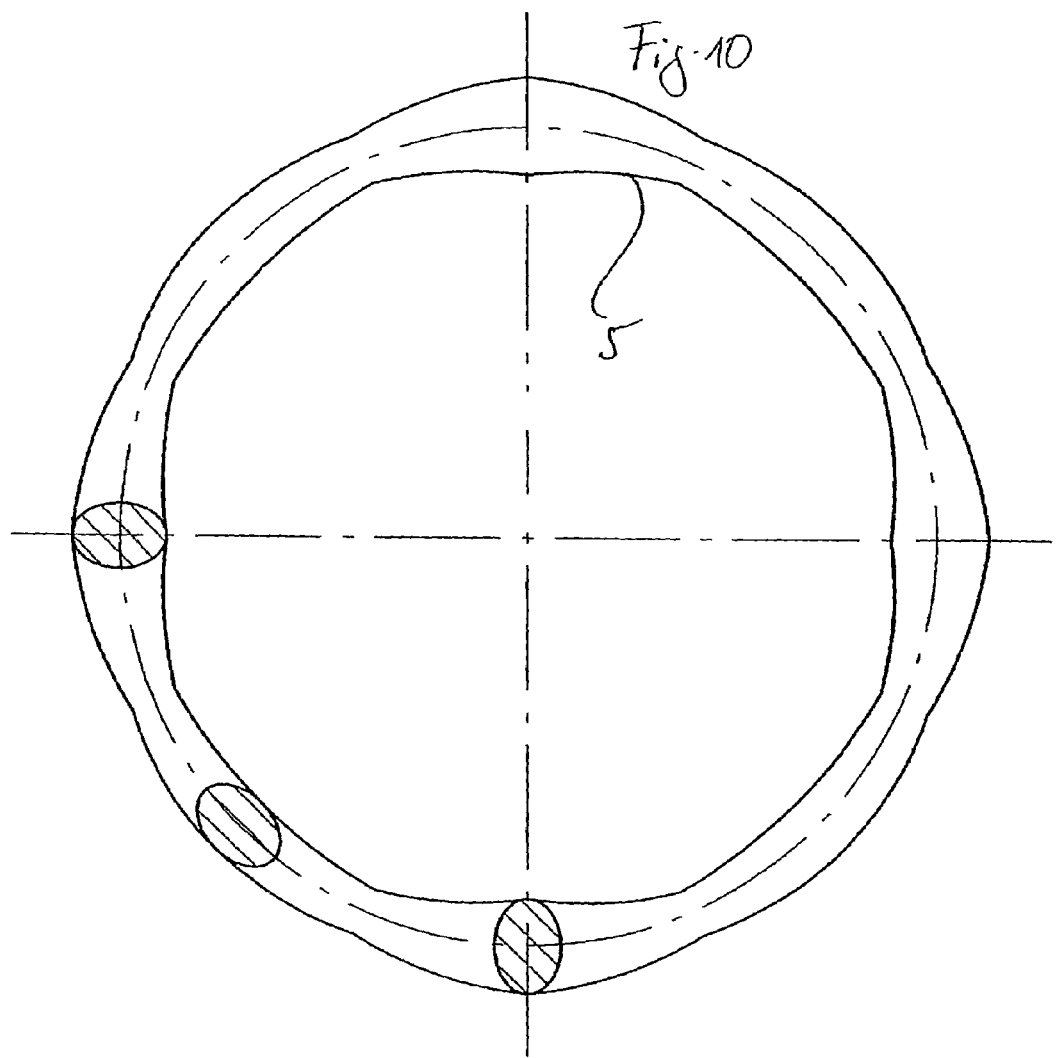
FIG. 10 shows a side view, partly in section, of the sealing element shown in FIG. 9.

A further variant of the sealing element 5 according to the invention is illustrated in FIGS. 8, 9 and 10. The sealing element 5 is of a uniform cross-section over its entire periphery, being an octagonal cross-section in the case of FIG. 8, as can be seen from the cross-sectional view indicated by VIII. That cross-section which is not rotationally symmetrical in relation also to the central axis extending in the peripheral direction of the sealing element 5 is turned in itself over the periphery of the sealing element 5 so that, in the unpressed condition, there are gaps between the bead 4 and the sealing element 5 and also gaps between the sealing element 5 and the outside surface of the pipe 6. As already mentioned hereinbefore, the sealing element 5 is not twisted in itself under stress, but is stable in respect of shape in the unstressed and unpressed condition, as shown in FIG. 5.

An alternative to the above-described structural principle is shown in FIGS. 9 and 10. Here too, the sealing element 5, over its entire periphery, is of a uniform cross-section which assumes a different angular position in region-wise manner in relation to an axis of symmetry through the geometrical center of gravity or in relation to the peripherally extending axis of the sealing element 5. In the illustrated embodiment the cross-section is elliptical and the sealing element 5 is subdivided over its periphery into eight arcuate segments, wherein in each of the segments the cross-section of the sealing element 5 is respectively arranged turned through 90°.

LIST OF REFERENCES

1 pipe connection
2 press fitting
3 region of a socket-like configuration
4 bead
5 sealing element
6 pipe
7 abutment
8 sealing surface
9 channels
10 thickenings
11 bores
12 arcuate segment

What is claimed is:

1. A press fitting for producing a non-releasably sealed connection between smooth-ended pipes with at least one portion of a socket-like configuration and at least one bead which is provided at the end of the socket portion and which accommodates at least one annular, rubber-elastic sealing element, characterized in that channels of a groove-shaped configuration extend through the surface of the sealing element, which channels communicate with each other in an unpressed condition of the sealing element, wherein the sealing surfaces which are interrupted by the channels are pressed against each other in a pressed condition to close the channels, wherein in the pressed condition, the sealing element and at least one of the smooth-ended pipes is radially compressed.

2. A press fitting as set forth in claim 1 characterized in that the sealing surfaces of the sealing element form the largest part of the surface of the sealing element.

3. An annular, rubber-elastic sealing element for use in a press fitting for producing a non-releasably sealed connection between smooth-ended pipes with at least one portion of a socket-like configuration and at least one bead which is provided approximately at the end of the socket portion and which accommodates said annular, rubber-elastic sealing element, characterized in that the surfaces of the sealing element includes channels of a groove-shaped configuration that extend through said sealing element, which channels communicate with each other in an unpressed condition of the sealing element, wherein the sealing surfaces which are interrupted by the channels are pressed against each other in a pressed condition to close the channels, wherein in the pressed condition, the sealing element and at least one of the smooth-ended pipes is radially compressed.

4. A press fitting for producing a non-releasably sealed connection between smooth-ended pipes with at least one portion of a socket-like configuration and at least one bead which is provided at the end of the socket portion and which accommodates at least one annular, rubber-elastic sealing element, characterized in that the sealing element, over its periphery, is of identical cross-section which is not rotationally symmetrical and which over the periphery of the sealing element assumes a different angular position in relation to an axis of symmetry through the geometric center of gravity of the cross-section, wherein in a pressed condition, the sealing element and at least one of the smooth-ended pipes is radially compressed.

5. A press fitting as set forth in claim 4 characterized in that the sealing element is of a polygonal cross-section which is turned in itself over the periphery of the sealing element.

6. A press fitting as set forth in claim 4 characterized in that the sealing element is of an elliptical cross-section.

* * * * *

UNITED STATES PATENT AND TRADEMARK OFFICE
CERTIFICATE OF CORRECTION

PATENT NO. : 7,475,918 B2  
APPLICATION NO. : 10/543784  
DATED : January 13, 2009  
INVENTOR(S) : Bernd Kaimer et al.

Page 1 of 1

It is certified that error appears in the above-identified patent and that said Letters Patent is hereby corrected as shown below:

On the Title Page, Item -57-, under "Abstract", line 6, delete "fiting" and insert -- fitting --, therefor.

On the Title Page, Item -57-, under "Abstract", line 7, after "by" delete "the fact that".

On the Title Page, Item -57-, under "Abstract", line 9, after "element" insert -- and which --.

Signed and Sealed this

Nineteenth Day of May, 2009

JOHN DOLL  
*Acting Director of the United States Patent and Trademark Office*